US011535979B2

(12) United States Patent
Okamura et al.

(10) Patent No.: US 11,535,979 B2
(45) Date of Patent: Dec. 27, 2022

(54) FIBER MATERIAL FOR CEMENT REINFORCEMENT

(71) Applicant: TEIJIN LIMITED, Osaka (JP)

(72) Inventors: Shuhei Okamura, Osaka (JP); Shintaro Shimada, Osaka (JP); Akira Teraoka, Osaka (JP); Takeya Dei, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 17/023,970

(22) Filed: Sep. 17, 2020

(65) Prior Publication Data

US 2021/0002819 A1 Jan. 7, 2021

Related U.S. Application Data

(62) Division of application No. 15/531,501, filed as application No. PCT/JP2016/050901 on Jan. 14, 2016.

(30) Foreign Application Priority Data

Jan. 19, 2015 (JP) ................ 2015-007728

(51) Int. Cl.
| | | |
|---|---|---|
| *D06M 15/55* | (2006.01) | |
| *C04B 14/38* | (2006.01) | |
| *D06M 13/395* | (2006.01) | |
| *C04B 18/02* | (2006.01) | |
| *C04B 16/06* | (2006.01) | |
| *C04B 20/10* | (2006.01) | |
| *C04B 28/02* | (2006.01) | |

(52) U.S. Cl.
CPC ............ *D06M 15/55* (2013.01); *C04B 14/38* (2013.01); *C04B 16/0675* (2013.01); *C04B 18/022* (2013.01); *C04B 20/1037* (2013.01); *C04B 28/02* (2013.01); *D06M 13/395* (2013.01)

(58) Field of Classification Search
CPC .................................................. D06M 15/55
USPC ........................................................ 428/357
See application file for complete search history.

(56) References Cited

U.S. PATENT DOCUMENTS

| | | |
|---|---|---|
| 4,101,334 A | 7/1978 | Hill et al. |
| 4,891,267 A | 1/1990 | Takahashi et al. |
| 5,455,113 A | 10/1995 | Girgis et al. |

| | | | |
|---|---|---|---|
| 2010/0151138 A1* | 6/2010 | Occhiello | ............ C08G 18/10 427/407.1 |
| 2015/0376404 A1 | 12/2015 | Kummer-Dörner et al. | |
| 2017/0342654 A1 | 11/2017 | Okamura et al. | |

FOREIGN PATENT DOCUMENTS

| | | | | |
|---|---|---|---|---|
| JP | 4-2876 A | 1/1992 | | |
| JP | 05-132875 A | 5/1993 | | |
| JP | 09-142902 A | 6/1997 | | |
| JP | 11-079807 A | 3/1999 | | |
| JP | 2000351858 A | 12/2000 | | |
| JP | 2003-55011 A | 2/2003 | | |
| JP | 2007-131464 A | 5/2007 | | |
| JP | 2012-025603 A | 2/2012 | | |
| JP | 2012025603 A * | 2/2012 | | |
| JP | 2014108898 A | 6/2014 | | |
| WO | 2013/041902 A1 | 3/2013 | | |
| WO | WO-2013041902 A1 * | 3/2013 | ............ | C04B 14/44 |
| WO | 2013/079482 A1 | 6/2013 | | |
| WO | 2014/114617 A1 | 7/2014 | | |

OTHER PUBLICATIONS

Machine Translation for JP 2012-025603. (Year: 2012).*
Communication dated Mar. 22, 2019 by The State Intellectual Property Office of People's Republic of China in application No. 201680006413.8.
Communication dated Aug. 6, 2018, from Intellectual Property Office of Singapore in counterpart application No. 11201705072Q.
Communication dated Dec. 12, 2017 from the European Patent Office in counterpart Application No. 16740042.3.
International Search Report for PCT/JP2016/050901, dated Apr. 12, 2016.
Machine Translation for WO 2013/079482 to Plaggenborg (Year: 2013); 24 Pages.
Liu, Ming-Yang et.al., "Glass Fibers With Clay Nanocomposite Coating: Improved Barrier Resistance in Alkaline Environment," Sep. 16, 2011, Composites, Part A 42, pp. 2051-2059 (YEAR: 2011).
Translation for JP 2012/025603 to Dei (Year: 2012); Teijin Techno Products Ltd; 21 Pages.

* cited by examiner

*Primary Examiner* — Peter Y Choi
(74) *Attorney, Agent, or Firm* — Sughrue Mion, PLLC

(57) ABSTRACT

Provided is a fiber material for cement reinforcement, configured such that a resin A containing an isocyanate compound as a constituent component is present inside a fiber bundled body, and a resin B containing an epoxy resin as a constituent component is present on a surface of the fiber bundled body. Further, it is preferable that the resin A contains a polyol or an epoxy compound as a constituent component in addition to the isocyanate compound, the resin B contains an acrylic-modified epoxy resin or a bisphenol-A epoxy resin as a main component, the fiber bundled body has a tensile strength of 7 cN/dtex or more, and the fiber bundled body includes 50 to 3,000 single fibers. The invention is also addressed to a concrete or mortar molded article using the above fiber material for reinforcement.

16 Claims, No Drawings

FIBER MATERIAL FOR CEMENT REINFORCEMENT

CROSS REFERENCE TO RELATED APPLICATIONS

This Application is a divisional of application Ser. No. 15/531,501 filed May 30, 2017, which is a National Stage of International Application No. PCT/JP2016/050901 filed Jan. 14, 2016 (claiming priority based on Japanese Patent Application No. 2015-007728 filed Jan. 19, 2015), the contents of which are incorporated herein by reference in their entirety.

TECHNICAL FIELD

The present invention relates to a fiber material suitable for cement reinforcement. It more specifically relates to a fiber material for cement reinforcement, which is optimal for the production of concrete, mortar, and the like.

BACKGROUND ART

Concrete or mortar formed products containing cement as a main component have compressive strength, durability, non-flammability, and like excellent characteristics and are also inexpensive, and thus have been abundantly used in the architectural and civil engineering fields. However, these formed products have drawbacks in that their physical properties are basically brittle even when aggregates such as sand and gravel are contained, and they are easily cracked or damaged, for example, upon application of a stress, such as pulling, bending, or flection.

Accordingly, in order to compensate for these drawbacks, it has been considered to use fibrous materials such as asbestos, glass fibers, steel fibers, and synthetic fibers as reinforcing materials in addition to various conventional aggregates, thereby improving the performance of a formed product. By using a fibrous reinforcing material, the mechanical characteristics, such as bending strength and bending toughness, of a cement formed body made of cement paste, mortar, concrete, or the like are significantly improved.

However, even in the case where such fibers for reinforcement are used, there have been problems in that when the fibers are not sufficiently dispersed in concrete or the like, or the fibers are entangled with each other during stirring, resulting in the formation of fiber agglomerates, the reinforcing effect is not sufficiently exhibited. Thus, in order to enhance the dispersibility of fibers, it has been considered to use a monofilament-type fiber having a large fiber diameter. However, in this case, there has been a problem in that the strength per fiber thickness decreases.

Then, it has been considered to employ thick monofilaments. In addition, in place of the conventional reinforcement with thin single fibers (filaments) that are hard to disperse, a method in which a fiber formed of a large number of thin filaments (multifilament) is bundled with a resin, and the fiber bundle is cut and used as a reinforcing material, has been considered.

For example, PTL 1 discloses a method in which non-volatile oil is attached to fibers bundled with a resin, thereby enhancing the cohesion of fibers. However, because of the attachment of oil to the fiber surface, although the cohesion is excellent, the interfacial attachment strength between cement mortar or concrete and fibers tends to rather decrease.

In addition, PTL 2 discloses a reinforcing material obtained by bundling fibers with a carboxyl-group-containing acrylic-modified resin, thereby maintaining relatively excellent cohesion in cement mortar. However, although a carboxyl-group-containing acrylic-modified resin has high affinity for cement, it has been difficult to enhance the cohesive strength of the resin layer present on the adhesion interface. In addition, there has been a problem in that in the case where a high-molecular-weight acrylic-modified resin having high cohesive strength is used, the resin is hard to penetrate the inside of the fiber bundle, and, as a result, a fiber bundle with high cohesion cannot be obtained.

These problems are particularly prominent in the case where the mortar or concrete to be reinforced has high physical properties, and the material viscosity at the time of kneading is high, or in the case where the shear force at the time of kneading is high, such as the case where the proportion of water or a binder is small at the time of kneading. Accordingly, it is difficult to maintain the cohesion of the fiber bundle, resulting in a problem in that the fresh fluidity decreases during the process, or the reinforcing effect in terms of bending toughness, etc., decreases.

PTL 1: JP-A-2007-131464
PTL 2: JP-A-2012-25603

SUMMARY OF INVENTION

Technical Problem

An object of the invention is to provide a fiber material for cement reinforcement having high cohesion and an excellent reinforcing effect, and particularly to provide a fiber material for cement reinforcement having an excellent reinforcing effect on high-viscosity concrete or mortar.

Solution to Problem

The fiber material for cement reinforcement of the invention is characterized in that a resin A containing an isocyanate compound as a constituent component is present inside a fiber bundled body, and a resin B containing an epoxy resin as a constituent component is present on a surface of the fiber bundled body.

Further, it is preferable that the resin A contains a polyol or an epoxy compound as a constituent component in addition to the isocyanate compound, the resin B contains an acrylic-modified epoxy resin or a bisphenol-A epoxy resin as a main component, and the isocyanate compound in the resin A is a blocked isocyanate compound. In addition, it is preferable that the fiber bundled body has a tensile strength of 7 cN/dtex or more, and the fiber bundled body includes 50 to 3,000 single fibers.

The invention also encompasses a concrete or mortar formed body containing the fiber material for cement reinforcement of the invention described above, which preferably further contains aggregates. Then, it is preferable that a method for producing such a concrete or mortar formed body is a production method in which the fiber material for cement reinforcement of the invention described above is contained, and the water/binder ratio at the time of kneading is 45% or less.

Advantageous Effects of Invention

According to the invention, a fiber material for cement reinforcement having high cohesion and an excellent reinforcing effect, particularly a fiber material for cement reinforcement having an excellent reinforcing effect on high-viscosity concrete or mortar, is provided.

DESCRIPTION OF EMBODIMENTS

The invention will be described in detail hereinafter.

The fiber material for cement reinforcement of the invention is a reinforcing material configured such that a resin A containing an isocyanate compound as a constituent component is present inside a fiber bundled body, and a resin B containing an epoxy resin as a constituent component is present on a surface of the fiber bundled body.

The fiber bundled body used for such a fiber material for cement reinforcement of the invention is not particularly limited as long as it is a fibrous material (multifilament) formed of a large number of single fibers (monofilaments) bundled, and various inorganic fibers and organic fibers (organic synthetic fiber) are usable.

More specifically, examples of fibers used for the fiber bundled body include inorganic fibers, such as carbon fibers, glass fibers, basalt fibers, steel fibers, ceramic fibers, and asbestos fibers, and organic fibers, such as aromatic polyamide fibers (hereinafter referred to as aramid fibers), vinylon fibers, polypropylene fibers, polyethylene fibers, polyarylate fibers, polybenzoxazole (PBO) fibers, nylon fibers, polyester fibers, acrylic fibers, vinyl chloride fibers, polyketone fibers, cellulose fibers, and pulp fibers. These fibers may be used alone or in combination of two or more kinds.

Further, it is preferable that the fiber used for the fiber material for cement reinforcement of the invention is a fiber that undergoes less degradation in an alkali. As inorganic fibers, carbon fibers, basalt fibers, and the like are preferable. As organic fibers, aramid fibers (aromatic polyamide fibers), vinylon fibers, polyethylene fibers, polypropylene fibers, and the like are preferable. It is more preferable that carbon fibers or aramid fibers having a high reinforcing effect in terms of bending toughness, etc., are used to form a fiber bundle.

Meanwhile, it is also preferable that the fiber used in the invention is an organic fiber using a resin produced using an organic polymer as a starting material. In the case where such an organic fiber is used for reinforcement, the fiber has excellent flexibility and is resistant to bending during the process, and thus is useful. In particular, aramid fibers, vinylon fibers, polyethylene fibers, polypropylene fibers, and the like, which are high-strength organic fibers, are preferable. This is because such an organic fiber undergoes less breakage during kneading or less strength deterioration due to corrosion or the like in concrete, eventually exhibiting an excellent reinforcing effect on a cement material. In order to enhance the strength of a fiber, in addition to its molecular structure, it is preferable to increase its molecular weight. For example, in the case of a polyethylene fiber, it is preferable use ultra high-molecular-weight polyethylene.

Among them, as the fiber used in the invention, comprehensively in terms of strength, flexibility, chemical resistance, and the like, para-type aramid fibers such as polyparaphenylene terephthalamide are preferable. Further, among such aramid fibers, copolymerized aramid fibers have particularly excellent alkali resistance and thus are particularly preferably used. As a specific example, a copolyparaphenylene-3,4'-oxydiphenylene-terephthalamide fiber, which is a copolymerized para-type aramid fiber, has a high reinforcing effect in cement as compared with other fibers and thus is preferable. Then, it is preferable that when the fiber is allowed to stand in a strong-alkali atmosphere at high temperatures and high pressures for a long period of time, its mechanical characteristics are not significantly degraded. Specifically, it is preferable that the strength retention of the fiber in steam curing at high temperatures and high pressures, for example, under conditions of 120° C., saturation water vapor, and 100 hours, is as high as 70% or more. Further, it is preferable that the fiber has a strength retention of 90 to 100%.

It is preferable that the single-yarn fineness of each fiber forming the fiber bundled body (single yarn, monofilament) is 0.5 to 100 dtex. When the single-yarn fineness is too low, it is difficult to align single yarns. Then, when the alignment of single yarns is insufficient, it tends to happen that the mechanical performance of the fiber cannot be sufficiently utilized. In addition, when the single-yarn fineness is low, the attachment of a bundling agent tends to be non-uniform, and predetermined cohesion may not be obtained. When the number of single yarns is too large, the cohesion tends to decrease. Meanwhile, in the case where the single-yarn fineness is too large, the adhesion area between single yarns is reduced. As a result, it becomes difficult to maintain the bundled state of single yarns with a bundling agent, and the reinforcing effect tends to decrease. It is more preferable that the single-yarn fineness of each single yarn forming the bundled body is 0.6 to 80 dtex. Further, the upper limit is 50 dtex or less, particularly preferably 6.0 dtex or less. In addition, it is preferable that the lower limit is 1.5 dtex or more, particularly preferably 1.5 to 3.0 dtex.

The fiber bundled body used in the invention is a collection of single yarns as described above, and preferably includes 50 to 3,000 single fibers. It is still more preferable that the fiber bundled body includes 100 to 1,500 single fibers. It is more preferable that the number of single fibers is 250 to 1100, particularly preferably within a range of 500 to 1,100.

In the invention, usually, such a multifilament-type fiber bundle is used. In some cases, it is also possible that a monofilament-type fiber having a large fiber diameter is used as a fiber bundled body. However, in the case of a monofilament-type fiber, which is once wound up as a single monofilament after spinning, with an increase in the fiber diameter, it becomes more difficult to produce a high-strength fiber. In the invention, also in terms of the reinforcing effect, it is preferable to use an ordinary multifilament-type fiber bundled body.

In addition, it is preferable that the fiber bundled body used in the invention is non-twisted or has a twist coefficient of less than 3 (within a range of 0 to 3). Such twisting further improves the reinforcing effect. In the case where the twist coefficient is too large, the strength tends to decrease. This is because as a result of twisting, at the time of pulling, a higher force perpendicular to the direction of the fiber axis is caused by single yarns. This phenomenon is particularly prominent in fibers having poor flexibility. In addition, when the twist coefficient is too large, the impregnation with a bundling agent tends to be non-uniform, and the elongation tends to increase due to twist shrinkage. When the twist coefficient is too small, the cohesion tends to decrease. As a result, the reinforcing effect on cement mortar or concrete tends to decrease. In the invention, it is more preferable that the twist coefficient is preferably less than 2 (within a range of 0 to 2). Further, it is preferable that the twist coefficient is within a range of 1.0 to 2.0, and it is particularly preferable that the twist coefficient is 1.5 to 2.0. As a result of twisting in such a preferred manner, when further bundling is performed with a bundling agent, the integration as a reinforcing material is enhanced. As a result, when the fiber bundled body is kneaded in cement mortar or concrete, the cohesion thereof is maintained, making it easy to ensure fluidity and constructability in the material. Incidentally, here, with respect to the twisting direction of the fiber bundled body, the bundled body may be single-twisted as usual, or may also be plied, of course.

Incidentally, here, the twist coefficient in the invention is expressed as the product of the number of twists per unit length and the square root of the fiber fineness, and is a value defined by the following equation described in ASTM D 885:

$$\text{twist coefficient} = \{\text{the number of twists(twists}/m) \times \sqrt{\text{fiber fineness (dtex)}}\}/1055.$$

In addition, it is preferable that the fiber used in the invention has high strength. More specifically, it is preferable that the fiber has a tensile strength of 7 cN/dtex or more. It is still more preferable that the tensile strength is within a range of 10 to 40 cN/dtex, particularly 20 to 40 cN/dtex. Here, in the case where the tensile strength of the fiber is too low, when a load is applied to cement mortar or concrete, the bending strength of the formed product tends to be low, or, due to fiber breakage, it tends to happen that the impact cannot be sufficiently absorbed.

The fiber material for cement reinforcement of the invention is configured such that a resin A containing an isocyanate compound as a constituent component is present inside the fiber bundled body described above, and a resin B containing an epoxy resin as a constituent component is present on a surface of the fiber bundled body. Further, it is preferable that the resin A contains a polyol or an epoxy compound as a constituent component in addition to the isocyanate compound.

Here, the resin A present inside the fiber bundled body serves as a bundling agent for fibers. In the invention, it is necessary that the resin A is a component containing an isocyanate compound as a constituent component. In the invention, when such a resin A is used, the resin A penetrates inside the fiber bundle and also adheres single yarns together in the fiber bundle, thereby facilitating firm bundling. Then, it is preferable that the resin A is a resin having high toughness. More specifically, it is preferable that the resin A is an isocyanate resin, a polyurethane resin, a urea resin, a crosslinked isocyanate-epoxy, or the like. In particular, an isocyanate resin, a urea resin, and a crosslinked isocyanate-epoxy are preferable.

Then, in the invention, the method for bundling fibers with the resin A is not particularly limited, and a method in which a fiber bundle is immersed in a solution of the resin A dissolved in an organic solvent such as toluene, followed by a heat treatment, thereby giving a fiber bundled body utilizing the self-crosslinking of the resin A, etc., a method in which a fiber bundle is immersed in an aqueous dispersion of the resin A, followed by a heat treatment, thereby giving a fiber bundled body utilizing the self-crosslinking of the resin A, etc., and the like can be mentioned. In terms of workability, it is preferable to use a water-based agent.

More specifically, in the case where an isocyanate resin is used as the resin A, a method in which a fiber bundle is immersed in a solution of an isocyanate compound dissolved in an organic solvent such as toluene, followed by a heat treatment, thereby giving a fiber bundled body utilizing the self-crosslinking of the isocyanate compound, a method in which a fiber bundle is immersed in an aqueous dispersion of a waterborne blocked isocyanate, followed by a heat treatment, thereby giving a fiber bundled body utilizing the self-crosslinking of the isocyanate compound from which the blocking agent has been dissociated, and the like can be mentioned. In terms of workability, it is preferable to use a water-based agent, and it is preferable that the isocyanate compound in the resin A used in the invention is a blocked isocyanate compound. In the case where a waterborne blocked isocyanate is used, the isocyanate does not react with water until the step of evaporating moisture. Accordingly, the deactivation of functional groups in steps before that, such as the immersion step, can be suppressed.

It is preferable that the isocyanate compound is selected from aromatic compounds, such as diphenylmethane diisocyanate and toluene diisocyanate, and aliphatic compounds, such as hexamethylene diisocyanate. Still more preferably, it is recommended to use an aliphatic isocyanate having excellent penetration into a fiber bundle. Further, it is preferable that such a compound has a dimer structure or a trimer structure. In addition, it is also preferable that the compound has a highly reactive, tri- or higher functional isocyanate group. Specifically, compounds having a hexamethylene diisocyanate (HDI) trimer structure, for example, are preferable. A trimer structure is a compound having, as its basic structure, acyclic structure formed of three NCO groups at the HDI terminal.

Then, in the case where the isocyanate compound is a blocked isocyanate compound, with respect to compounds for blocking isocyanate groups, specifically, dimethylpyrazole-blocked, methyl-ethyl-ketone-oxime blocked, caprolactam-blocked, and like blocked isocyanates are preferable. Among them, it is preferable to use a dimethylpyrazole-blocked isocyanate compound, particularly dimethylpyrazole-blocked hexamethylene diisocyanate. In particular, a dimethylpyrazole-blocked compound is a heterocyclic compound containing a nitrogen atom and the like in the cyclic structure in addition to a carbon atom, and is likely to have a resonance structure. Accordingly, the blocked compound is unblocked at lower temperatures, and thus such a compound is more preferably used. In particular, in terms of reactivity and unblocking temperature, it is preferable to use a compound blocked with dimethylpyrazole or the like and having an aliphatic tri- or higher functional isocyanate group (dimethylpyrazole block-HDI trimmer, etc.).

Such a dimethylpyrazole-blocked isocyanate compound has high compatibility with the fiber-forming polymer. Then, when the fiber having attached thereto such a compound is heat-treated, and, according to the thermal history, the compound is allowed to thermally diffuse into the fibers over a sufficient period of time, resulting in high interface-reinforcing ability.

In addition, it is also preferable to use a polyurethane resin as the resin A. A polyurethane resin is a resin obtained by the condensation of a polyol and an isocyanate compound. Then, as a method for using such a resin, it is possible to employ a method in which a fiber bundle is immersed in a solution of a polyol and an isocyanate dissolved in an organic solvent or a solution containing an aqueous dispersion of a waterborne polyol and a waterborne blocked isocyanate, followed by a heat treatment, thereby giving a fiber bundled body; a method in which fibers are immersed in a solution of a pre-condensed urethane resin dissolved in an organic solvent or in an aqueous dispersion thereof, and then the organic solvent or water is dried, thereby giving a fiber bundled body; or the like. In addition, it is also preferable to use a urea resin as the resin A. Here, a urea resin is a resin obtained by the condensation of an amine and an isocyanate compound.

Among them, it is particularly preferable that the resin A is a crosslinked isocyanate compound-epoxy compound. As a method for using such a resin, an isocyanate compound having a relatively low molecular weight and a highly reactive epoxy compound similarly having a relatively low molecular weight are penetrated into fibers, followed by a heat treatment, whereby a preferred fiber bundled body can be obtained. When the compounds are crosslinked from the inside of a fiber bundle in this manner, single yarns are firmly adhered together inside the fiber bundle, and a firmly bundled fiber bundled body can be obtained. In particular, it is particularly preferable to use an aqueous dispersion of a blocked isocyanate having an aliphatic hexamethylene diisocyanate (HDI) structure, which has excellent penetration into a fiber bundle, and a water-soluble high epoxy compound having a sorbitol polyglycidyl ether structure. More specifically, it is preferable that dimethylpyrazole-blocked hexamethylene diisocyanate or caprolactam-blocked diphenylmethane diisocyanate is used as a blocked isocyanate, and a sorbitol polyglycidyl ether-type epoxy compound is used in combination as an epoxy compound.

In addition, in the invention, more specifically, specific methods for attaching the resin A used as a bundling agent to the inside of a fiber bundled body are as follows. A multifilament (long fiber) formed of a collection of single fibers, a plurality of such fibers aligned, or long fibers in tow form are continuously fed from a bobbin or a beam creel. Then, (1) the fibers are impregnated in a tank containing the bundling agent, (2) the bundling agent is attached by a roller touch method, or (3) the bundling agent is sprayed and attached, for example. Among them, in order to uniformly attach the resin A to fibers, the method (1) in which the fibers are impregnated in a tank containing the bundling agent is preferable, and it is still more preferable that the amount attached is subsequently adjusted to a certain amount with a squeeze roller.

In addition, in order to promote the impregnation and penetration of the resin A to serve as a bundling agent into the fiber bundle as described above, a method in which the bundling agent is dispersed or dissolved in a water-based emulsion or an organic solvent, thus diluted, and used is preferable. In particular, as a method for implementing the invention, it is preferable to perform a water-based treatment. An organic solvent having dissolved therein a bundling agent has increased viscosity, and its penetration into a fiber bundle tends to be insufficient. Also from this point of view, in the invention, it is preferable to use a compound having a relatively low molecular weight, which has increased water solubility. In addition, in the case where a treatment method in which the bundling agent is dissolved in an organic solvent is employed, it is necessary to use a large amount of organic solvent. In terms of safety and work environment load, and also in terms of cost for the adhesion treatment facility, the treatment of recovered/waste liquid, and the peripheral facilities, a water-based treatment is preferable.

Usually, it is preferable that the fiber bundle having applied thereto a bundling agent is then subjected to a heat treatment to dry the dispersion medium for the bundling agent, or occasionally cause crosslinking by the heat treatment. As a treatment device, a contact hot roller and the like are usable. However, it is preferable to use a non-contact hot-air drying furnace, which prevents the bundling agent from adhering to or soiling the device and thus facilitates the work. The treatment temperature at this time is about 105 to 300° C., and it is particularly preferable that drying is performed at about 120 to 250° C. According to one preferred embodiment, in this stage or after the following treatment with the resin B, the obtained fibrous material is cut to a predetermined fiber length with a known cutting machine.

With respect to the amount of the resin A attached, it is preferable that the resin A is applied in an amount of 3 to 15 wt % relative to the total fiber weight. In the case where the amount attached is too small, it tends to happen that the bundle is released, and the single fibers come apart, resulting in loss of the fluidity of the material. This is because when a shear force is applied to fibers during kneading with concrete or mortar, the bundling of fibers with a bundling agent cannot be maintained. Meanwhile, in the case where the amount attached is too large, the strength of fibers tends not to be sufficiently utilized. In the case where the amount attached is increased too much, the cohesion itself is not much improved. In addition, another reason is that when the amount of the resin attached is large, due to an increase in the apparent fineness of the fiber bundled body, the tensile strength of the bundled fiber per weight also decreases. In the invention, the amount of the resin A attached relative to the fiber weight is more preferably 5.0 to 15.0 wt %, and particularly preferably within a range of 7.0 to 10.0 wt %.

The fiber material for cement reinforcement of the invention is configured such that the resin A containing an isocyanate compound as a constituent component is present inside a fiber bundled body as described above, and it is further necessary that a resin B containing an epoxy resin as a constituent component is present on a surface of the fiber bundled body. Here, when the fiber bundle is composed only of the resin A, the interfacial adhesion force with concrete or mortar is not sufficient, and it is necessary in the invention that the surface thereof is coated with the resin component B. The isocyanate compound used as the resin A, which has excellent affinity for water, has a relatively low molecular weight, and even at the time of crosslinking, the functional group reacts with water and is deactivated, causing no increase in the molecular weight. As a result, the cohesive strength tends to be insufficient. In addition, as a result of penetrating into the inside of the fiber bundle, the amount of the resin A attached to the fiber bundle surface tends to be small, and the fiber bundle surface becomes flat, resulting in insufficient interfacial adhesion. However, it is believed that because of the presence of the resin B containing an epoxy resin as a constituent component, the interfacial adhesion strength with cement is increased.

Here, the resin B containing an epoxy resin as a constituent component should be a resin obtained by the reaction of a compound having an epoxy group as one of the constituent components. More specifically, as the resin B, as long as it is a resin obtained by the reaction of a compound having an epoxy group as one of the constituent components, any of those available as adhesives or coating materials in the open market may be used. However, a resin whose main component is a resin obtained by the reaction of a compound having an epoxy group as one of the constituent components is preferable. Further, in terms of cohesive strength and interfacial adhesion strength, an acrylic-modified epoxy resin and a bisphenol-A epoxy resin, which exhibit high performance, are preferable. It is particularly preferable that the resin B is a resin composed of an acrylic-modified bisphenol-A epoxy resin.

Further, it is also preferable that such an acrylic-modified epoxy resin is a resin having a high degree of acrylic modification, which is called an epoxy acrylate resin or a vinyl ester resin. This epoxy acrylate resin is a synthetic resin obtained by adding an acrylic group or a methacrylic group to an epoxy resin prepolymer, and is a resin resulting from the reaction between an epoxy resin and a (meth) acrylic acid. Further, it is preferable that the resin has the same bisphenol skeleton as a bisphenol-A epoxy resin on the main chain and has an unsaturated ester group (vinyl ester group) on the side chain.

In addition, it is preferable that the molecular weight of the resin B is 10,000 or more. Also in terms of the convenience of the processing treatment, it is preferable that the treatment liquid containing the resin B is a water-based emulsion.

In addition, although the resin B of the invention is used as a coating agent, for the purpose of improving strength and toughness or imparting heat resistance and chemical resistance, it is also preferable to add a known hardener, such as a melamine resin, a phenol resin, or a blocked isocyanate. The proportion of the hardener blended is not particularly limited, but it is preferable that the bisphenol-A or like epoxy resin, which is a base compound, is 50 wt % or more on a solid basis.

With respect to the amount of the resin B attached, it is preferable that the resin B is applied in an amount of 0.1 to 10 wt % relative to the total fiber weight. In the case where the amount attached is too small, when a stress is applied inside concrete or cement, the cohesive strength at the interface may be insufficient. Thus, it tends to happen that the fiber reinforcing material is easily shed and does not exhibit sufficient reinforcing properties. Meanwhile, in the case where the amount attached is too large, the amount of the coating agent in the reinforcing material increases. Accordingly, due to an increase in the apparent fineness, the tensile strength of the fiber reinforcing material decreases, and the strength of the fiber tends not to be sufficiently utilized. It is more preferable that the resin B is attached in an amount of 0.5 to 5.0 wt %, still more preferably within a range of 1.0 to 3.0 wt %. Further, it is particularly preferable that the total amount of the resins A and B attached to the fiber bundle is 8.0 to 15 wt %.

In addition, as a combination of the resin A and the resin B, it is preferable that the isocyanate compound contained in the resin A is a blocked isocyanate, while the resin B contains an acrylic-modified epoxy resin as a main component, or that the isocyanate compound contained in the resin A is a blocked isocyanate, and the resin B contains a bisphenol-A epoxy resin as a main component. In particular, it is preferable that the resin B contains an acrylic-modified bisphenol-A epoxy resin as a main component.

Because of the synergistic effects of the resin A inside the fiber bundle and the resin B on the fiber bundle surface as described above, the fiber material for cement reinforcement of the invention has become a fiber bundle having sufficient cohesion. The fiber material of the invention is suitable for use in cement mortar or concrete as described below. However, in the case where a high shear force is applied to the fibers at the time of kneading during the production process, and the bundle is released, the reinforcing effect of the fibers decreases. Further, unbundled single fibers are likely to be entangled with each other and form large fiber agglomerates, resulting in a decrease in the fresh fluidity or constructability of cement mortar or concrete. However, because of its high cohesion, the fiber material for cement reinforcement of the invention has an excellent reinforcing effect and excellent constructability. Particularly in recent years, high-strength or ultrahigh-strength mortar and concrete have been required. They generally have a low water/binder ratio, resulting in a high-viscosity material, whereby an even higher shear force is applied to the fiber material for reinforcement. For this reason, the fiber material of the invention with high cohesion is particularly useful.

The fiber material for cement reinforcement of the invention is configured such that the resin A containing an isocyanate compound as a constituent component is present inside a fiber bundled body as described above, and the resin B containing an epoxy resin as a constituent component is present on a surface of the fiber bundled body. Then, the diameter of the bundled fiber reinforcing material and the fiber length of the fiber bundled body affect the bending toughness of a concrete or mortar formed body. That is, the presence of the fiber reinforcing material increases the bending fracture energy (sometimes referred to as "bending energy") of a concrete or mortar formed body.

It is preferable that the diameter of the bundled fiber reinforcing material is 0.05 to 1.0 mm, more preferably 0.1 mm to 0.8 mm, and still more preferably 0.3 mm to 0.5 mm. It is preferable that the length is 1 to 50 mm, more preferably 5 mm to 40 mm, and particularly preferably within a range of 15 mm to 35 mm. The impact on bending energy and fresh fluidity may also be considered from the aspect ratio expressed as the relation of the fiber length [mm]/the diameter of the fiber bundled body [mm]. It is preferable that the aspect ratio is 30 to 120, more preferably 50 to 80. When the size is as above, the reinforcing effect of fiber incorporation, that is, suppressed cracking, increased bending strength/increased bending toughness (increased bending fracture energy), or the like, can be imparted more effectively.

When the diameter of the bundled fiber reinforcing material is reduced, or the fiber length is increased, that is, when the aspect ratio is increased, the total contact surface area of the fibers with cement mortar or concrete increases, making it possible to increase the attachment strength. Further, it becomes possible to significantly improve the bending energy. However, meanwhile, when the aspect ratio is too high, an increased number of fibers break. As a result, when the width of cracks increases, the reinforcing effect decreases, and the bending energy tends to decrease. In addition, at the time of kneading in cement mortar or concrete, a high shear force is applied to the fibers, making it difficult to maintain the cohesion with the bundling agent. Further, in some cases, the bundle is released into single fibers, impairing the fluidity of the material.

Conversely, when the diameter of the bundled fiber reinforcing material is increased, or the fiber length is reduced, that is, when the aspect ratio is reduced, the cutting of fibers is unlikely to occur, and the energy at the time of the shedding of fibers can be utilized at maximum. However, meanwhile, when the fiber length of the bundled fiber is too short, or the diameter is too large, that is, when the aspect ratio is too low, the total contact surface area of the fibers with cement mortar or concrete is small, and it tends to be impossible to obtain a sufficient reinforcing effect.

Considering the dispersibility of the fiber material for reinforcement, short fibers having a small fiber length are preferable, while in terms of improving the reinforcing effect, it is preferable to use short fibers having a large fiber length. However, with respect to the fiber length, it is necessary to consider the deterioration of the workability due to a decrease in dispersibility or the generation of fiber agglomerates due to the entanglement of fibers during stirring, and it is preferable that the fiber length is within the above range.

By using such a fiber material for cement reinforcement of the invention, it has been made possible to improve the bending energy of the finally obtained concrete or mortar formed body. That is, after the initial cracking of a concrete or mortar formed body, the fiber bundled body bridges the crack, whereby the formed body is reinforced. However, although some fibers contribute to the reinforcement until breakage, other fibers are shed. However, the frictional force between the fiber bundled body and the concrete or mortar formed body at the time of shedding also significantly contributes to the bending energy. For example, looking at a stress-strain curve in a bending test after initial cracking, it is preferable that the diameter, the fiber length, and the like of the fiber bundled body are varied depending on the application, such as the case where the reinforcing effect within a narrow range where the crack width is less than 2 mm, etc., is expected, or the case where the reinforcing effect within a wide range, where the crack width is up to 6 mm, etc., is expected. Although this is affected by the attachment strength between each fiber bundled body and the concrete or mortar formed body, especially in a region having a small crack width, long fibers having a large aspect ratio, which have excellent adhesion strength, are effective.

In addition, it is preferable that the concrete fiber material for reinforcement of the invention has high strength. More specifically, it is preferable that the tensile strength of the fiber bundled body forming the fiber material is 7 cN/dtex or more, particularly preferably within a range of 10 to 40 cN/dtex. Here, the strength of the fiber material for reinforcement is measured after treatments with the resin A and the resin B and before cutting in the length direction. Here, in the case where the tensile strength of the fiber material is too low, when a load is applied to cement mortar or concrete, the bending strength of the formed product tends to be low, or the impact strength tends to decrease.

In addition, the incorporation rate of fibers forming the fiber material for reinforcement of the invention into cement mortar or concrete may be selected according to the purpose. However, it is usually preferable that the fibers are used within a range of 0.01 to 10.0 vol %, more preferably within a range of 0.05 to 5.0 vol %, still more preferably 0.1 to 3.0 vol %, and particularly preferably within a range of 0.2 to 1.5 vol %. Further, in another preferred mode, the fiber material for reinforcement of the invention and an existing fiber material are used in combination. In the case where the fiber incorporation rate is too low, the suppression of cracking and the impartment of strength and toughness tend to decrease. Conversely, when the fiber incorporation rate is too high, fibers are entangled with each other, resulting in the formation of fiber agglomerates or defective dispersion of fibers. Then, the fluidity of cement mortar or concrete when fresh is impaired, and the workability at the time of construction tends to be inhibited. Further, in the case where the incorporation rate is too high, it becomes difficult to obtain a reinforcing effect or a toughness-improving effect that matches the fiber incorporation rate. In addition, the compressive strength of the cement mortar or concrete also decreases. However, as long as the incorporation rate is within an ordinary range, whether the amount of fiber incorporation is large or small does not have significant impact on compressive strength.

Here, the fiber incorporation rate (Vf: fiber volume fraction) is a proportion (vol %) expressed by the following equation:

$$Vf=(V_1/V_2)\times 100.$$

(In the equation, $V_1$ represents the volume (liter) of the fibers for reinforcement incorporated per unit volume (1,000 l=1 m$^3$) of the fiber-containing cement formed body, and $V_2$ represents the unit volume (1,000 l=1 m$^3$) of the cement formed body).

The fiber material for reinforcement of the invention is particularly effective for cement serving as a binder for concrete or mortar, and is preferably used for concrete reinforcement and mortar reinforcement. Cement serving as a binder for concrete or mortar is selected considering the construction conditions of the worksite and the like, and the fiber material for cement reinforcement of the invention can be combined with various types of cement. More specifically, for example, various types of Portland cement such as ordinary cement, high-early-strength cement, ultrahigh-early-strength cement, low-heat cement, and moderate-heat cement, as well as various types of blended cement such as Portland blast furnace cement prepared by mixing these various types of Portland cement with fly ash, blast furnace slag, or the like, rapid hardening cement, and the like, can be mentioned. They can be used alone or as a mixture of two or more kinds.

Now, the fiber material for cement reinforcement of the invention is preferably used as a material for concrete or mortar together with the above cement (binder), and provides a concrete or mortar formed body containing the fiber material for cement reinforcement, which is another embodiment of the invention.

At this time, together with the fiber material for reinforcement of the invention, it is preferable that known admixtures (binders) are added to the cement to be reinforced. Examples of admixtures include blast furnace slag powder, fly ash, silica fume, limestone powder, quartz powder, gypsum dihydrate, gypsum hemihydrate, gypsum anhydrite, quicklime-based expansive admixtures, and calcium sulfoaluminate-based expansive admixtures. Their proportions are not particularly limited, and various designs are possible.

Further, it is preferable that the following aggregates are added to the fiber material for cement reinforcement of the invention to form a concrete or mortar formed body containing aggregates. Such aggregates for concrete or mortar may only be fine aggregates, such as river sand, beach sand, mountain sand, crushed sand, silica sands Nos. 3 to 8, limestone, and slag fine aggregates. Alternatively, according to the required properties of the application, it is also preferable that coarse aggregates, such as river gravel, crushed stone, and artificial aggregates, are mixed with fine aggregates and used. With respect to the aggregate/cement (binder) ratio in concrete or mortar, in terms of suppressing hydration heat, suppressing dry shrinkage, and reducing the cost, it is preferable that the aggregates are 50% or more.

In addition, generally, in the case where the proportion of coarse aggregates in the aggregates is large, processing is difficult. However, in the case where the fiber material for cement reinforcement of the invention is used together, the interfacial adhesion effect with a binder (cement) is improved. As a result, even when the proportion of coarse aggregates is large, effective strength and processability can be maintained.

That is, the fiber material for cement reinforcement of the invention causes a sufficient reinforcing effect even at a low fiber incorporation rate. Accordingly, the fiber material is particularly effective for concrete or mortar that has a low water/binder ratio, has a high coarse aggregate content, or has high material viscosity and is difficult to process. More specifically, it is preferable that the fiber material is used for a concrete or mortar formed body having a water/binder ratio of 45% or less, still more preferably 40% or less. Further, the fiber material is optimal for use in mortar or concrete having a water/binder ratio of 25% or less, or in mortar or concrete having a water/binder ratio of 45% or less and an aggregate/binder ratio of 250% or more.

In particular, the fiber material for cement reinforcement of the invention can be preferably used in the case where the water/binder ratio is 25% or less, particularly preferably in the case of a water/binder ratio of 10 to 20%. The mechanical properties of the concrete or mortar obtained using cement having such a low water/binder ratio can be further enhanced. The fiber material of the invention may also be used with the water/binder ratio being normally high. However, when the water/binder ratio is too low, sufficient kneading is difficult even with the fiber material of the invention.

In steps before such a fiber material for cement reinforcement of the invention forms a concrete or mortar formed body, a suitable amount of kneading water is added to cement and the like and kneaded. Then, it is preferable to employ a method for producing a concrete or mortar formed body containing the fiber material for cement reinforcement of the invention and having a water/binder ratio of 45% or less at the time of kneading. As the kneading water at this time, as long as components that adversely affect the hardening of cement and the like are not contained, tap water, underground water, river water, and like water can be used. However, it is preferable to use water conforming to "JIS A 5308, Appendix 9, Water Used for Kneading of Ready-Mixed Concrete."

Then, in order to obtain mortar (cement mortar), sand (fine particulate aggregates, fine aggregates), cement, and water are kneaded to paste-like softness, and the fiber material for cement reinforcement of the invention is mixed therewith. In the case of concrete, in addition to the fine particulate aggregates, larger coarse aggregates (gravel, etc.) are mixed.

At this time, in the concrete or mortar formed body, without substantially interfering with the object, it is also possible to use additives in addition to the above materials. Examples of additives include AE water reducing agents, high-range AE water reducing agents, shrinkage reducing agents, setting retarders, hardening accelerators, thickeners, defoaming agents, foaming agents, anti-corrosive agents, anti-freezing agents, clay mineral-based thixotropy-imparting agents, colorants, and water retention agents.

Then, the use of the fiber material for cement reinforcement of the invention has made it possible to obtain concrete or mortar having excellent physical properties. Specific examples of methods for adding the fiber material to concrete or mortar include a method in which cement, fine aggregates, coarse aggregates, and the like are previously mixed with the fiber material for cement reinforcement of the invention to form a dry premix, and then kneading water is added and kneaded, and also a method in which cement, fine aggregates, and coarse aggregates, and the like are sufficiently stirred with kneading water, and then the reinforcing material of the invention is finally added and kneaded.

As a kneading machine used for stirring the cement mortar or concrete containing the fiber material for reinforcement of the invention, it is possible to use a pan-type mixer, a tilting mixer, an Omni mixer, a Hobart mixer, a truck mixer, or the like.

Even during the kneading step, the cohesion of fibers in the fiber material for cement reinforcement of the invention is high. Thus, even during kneading that causes a high shearing force, such as the kneading of concrete or mortar having a low water/binder ratio, breakage hardly occurred, and the fluidity and constructability of the material were not inhibited. Further, in the concrete or mortar formed product reinforced with the fiber material for cement reinforcement of the invention, fibers do not undergo rapid breakage even when the applied stress increases. As a result, the bending fracture energy of the formed product was significantly improved.

The applications of such concrete or mortar formed bodies containing the fiber material for cement reinforcement of the invention are not particularly limited, and they can be widely used for general civil engineering and architectural applications. For example, by employing spray molding, press molding, vibration molding, centrifugation molding, and the like, wide variety of applications are possible, including the reinforcement of slopes, the foundation work of building structures, and the like. Further, also with respect to the production of secondary formed products (blocks, plate-like products, sheet-like products, tetrapods, etc.), various forming methods may be employed. In addition, in the case of mortar, in addition to use for the rough coating or finish coating of a concrete surface, it is also preferable to use the mortar for joints of bricks and concrete blocks, for example.

EXAMPLES

Hereinafter, the invention will be described in further detail with reference to examples and comparative examples. Incidentally, for each evaluation in the examples, measurement was performed as follows.

(1) Fiber Length, Fineness

Measurement was performed in accordance with JIS-L-1015.

(2) Fiber Tensile Strength

Measurement was performed in accordance with ASTM D 885.

(3) Fiber Bundle Diameter and Fiber Bundle Length of Bundled Fiber Bundle

With respect to a treated fiber bundle (treated yarn), which had been treated with a bundling agent and cut, the diameter of the fiber bundle and the length of the fiber bundle were measured with a digital vernier caliper (manufactured by A&D Company, Limited).

(4) Bundling Properties of Bundled Fiber Bundle

A cross-section of a fiber bundle, which had been treated with a bundling agent, was observed under a scanning electron microscope to see whether single yarns were adhered together inside the fiber bundle, and evaluation was performed as follows.

Excellent: Adjacent single yarns, including single yarns located in the central part of the fiber bundle, are adhered together.

Fair: Adjacent single yarns, including single yarns located in the inner part (about ¼ to ¾ of the radius) of the fiber bundle, are adhered together.

Poor: Most of the resin is attached to the outer peripheral part of the fiber bundle, and only single yarns in the surface layer of the fiber bundle are adhered to adjacent single yarns.

(5) Bundling Properties of Fiber Bundle after Kneading

The obtained fiber reinforcing material was stirred with cement, aggregates, water, and the like by the method described in the following reference example, thereby giving ready-mixed concrete (or unhardened cement mortar).

Next, a small amount of the obtained ready-mixed concrete (or unhardened cement mortar) was scooped up, washed with water, and the extracted fibers for reinforcement were visually observed. At this time, when the fiber material was coated with the bundling agent, and the single yarns were not separated, the cohesion was judged to be excellent. Meanwhile, when the fiber bundle came apart, and cement was attached between single yarns in 10% or more of the entire fiber material, the cohesion was judged to be poor.

(6) Fluidity of Ready-Mixed Concrete

Using the ready-mixed concrete (or unhardened cement mortar) described in the reference example, the following step was performed after the kneading step. Above a 50-cm square, horizontally disposed aluminum board, the ready-mixed concrete was poured into a slump cone (conical post having a height of 15 cm, a bottom inner diameter of 10 cm, and a top inner diameter of 5 cm, with a hollow interior) while scraping off the excess, and the slump cone was slowly vertically pulled up. At this time, the ready-mixed concrete spreads in a circle over the aluminum board. The diameter of the spread circle at this time, or alternatively the arithmetic average of the shortest diameter and the longest diameter in the case of a distorted circle, was measured as a flow value. The flow value reflects the fluidity of the ready-mixed concrete. When the flow value was 250 mm or more, the concrete was judged to have "excellent constructability", while when it was less than 200 mm, the concrete was judged to have "poor constructability."

(7) Compressive Strength and Bending Fracture Energy of Concrete Formed Product

The ready-mixed concrete (or unhardened cement mortar) obtained in the reference example was used.

First, in accordance with JIS A 1132, a cylinder having a diameter of 100 mm was produced and then cured at 20° C. and 90% RH until a material age of 28 days, thereby giving a cylindrical test piece. Subsequently, measurement was performed in accordance with JIS A 1108 to determine the compressive strength.

In addition, the ready-mixed concrete obtained in the reference example was placed in a mold 40 mm wide×40 mm high×160 mm long, and cured at 20° C. and 90% RH until a material age of 28 days, thereby giving a test piece for the measurement of bending fracture energy.

The above test piece was subjected to a three-point bending test in accordance with JIS R 5201. More specifically, using a 10-t tensile compression tester (manufactured by Toyo Baldwin Corporation, "UNIVERSAL TESTING INSTRUMENT MODEL UTM 10 t"), the center of a 10-cm distance between support points was compressed at a rate of 2 mm/min. Then, from the measurement data of bending stress-strain obtained, the fracture energy necessary for the fracture of the test piece until a crack mouth opening displacement of 6 mm was calculated. A fracture energy of more than 10 kN·mm was judged to be excellent, and a fracture energy of 10 kN·mm or less was judged to be poor.

Reference Example 1

(Preparation of Ready-Mixed Concrete)

Using a mortar mixer (manufactured by Marui & Co., Ltd., "MIC-362", volume: 5 L), each of the fiber reinforcing materials obtained in the examples and comparative examples was kneaded at a stirring rate of 140 rpm for about 3 minutes together with 1,000 g of low-heat Portland cement (manufactured by Taiheiyo Cement Corporation), 200 g of silica fume (manufactured by Elkem AS), 500 g of fine aggregates (manufactured by San-Ei Silica Co., Ltd., "Silica Sand No. 6"), 400 g of coarse aggregates (manufactured by Kansai Matec Co., Ltd., "Crushed Stone 1505"), 30 g of a high-range water reducing agent ("Rheobuild SP8HU" manufactured by BASF), and 200 g of water.

As a result, ready-mixed concrete having a water/binder ratio of 19.2% and an aggregate/binder ratio of 75.0% was obtained.

Reference Example 2

(Preparation of Uncured Cement Mortar)

Using a mortar mixer (manufactured by Marui & Co., Ltd., "MIC-362", volume: 5 L), each of the fiber reinforcing materials obtained in the examples and comparative examples was kneaded at a stirring rate of 140 rpm for about 3 minutes together with 450 g of low-heat Portland cement (manufactured by Taiheiyo Cement Corporation), 1,700 g of fine aggregates (manufactured by San-Ei Silica Co., Ltd., "Silica Sand No. 6"), 10 g of a high-range water reducing agent ("Rheobuild SP8HU" manufactured by BASF), and 170 g of water.

As a result, unhardened cement mortar having a water/binder ratio of 40.0% and an aggregate/binder ratio of 380% was obtained.

Example 1

As a fiber to form a fiber material for reinforcement, a copolymerized aramid fiber (copolymerized aromatic polyamide fiber, "Technora" manufactured by Teijin Limited, 1,670 dtex, the number of filaments: 1,000, tensile strength: 24.5 cN/dtex, "strength retention under conditions of 120° C., saturated water vapor, 100 hours: 99%") was used. Using a twisting machine, the fiber was single-twisted to give a fiber bundle having a twist coefficient of 2.

As the resin A to serve as a bundling agent, a sorbitol polyglycidyl ether-based epoxy compound (manufactured by Nagase ChemteX Corporation, "EX614B") and dimethylpyrazole-blocked hexamethylene diisocyanate (manufactured by Baxenden, "Trixene Aqua 201", dimethylpyrazole block-HDI trimmer) were mixed at a ratio of 50:50 wt % on a solid basis, thereby giving a resin-A-containing liquid having a total solid content of 10 wt %.

The obtained fiber bundle was immersed in the resin-A-containing liquid and then dried at a temperature of 200° C., thereby giving a fiber bundle having attached thereto a bundling agent at 10 wt %.

As the resin B to serve as a coating agent, an aqueous dispersion having a solid content of 10 w % and containing a carboxyl-group-containing acrylic-modified bisphenol-A epoxy resin ("DIC FINE EN" manufactured by DIC Corporation) was prepared.

Subsequently, the fiber bundle having attached thereto the resin A was immersed in the aqueous dispersion of the resin B. Subsequently, the fiber bundle was dried at a temperature of 200° C., thereby giving a treated fiber bundle in which the amount of the coating agent (resin B) attached to the treated fiber bundle was 3 wt %. The diameter of the obtained treated fiber bundle was 0.45 mm. The treated fiber bundle was cut to 30 mm to give a fiber material for cement reinforcement. The physical properties are shown in Table 1.

Using the fiber material for reinforcement, the ready-mixed concrete having a water/binder ratio of 19.2 of Reference Example 1 was cured, thereby giving a concrete formed body (the incorporation rate of the fiber material for reinforcement: 1 vol %). The evaluation results are shown in Table 1 (incidentally, some of the evaluation results are also shown in Table 2 for comparison).

Next, using the unhardened cement mortar having a water/binder ratio of 40.0% of Reference Example 2 in place of the ready-mixed concrete of Reference Example 1, a mortar formed body having an incorporation rate of the fiber material for reinforcement increased from 1 vol % to 3 vol % was obtained. The evaluation results are shown in Table 2.

Example 2

A fiber material for cement reinforcement and a concrete formed body were produced and evaluated in the same manner as in Example 1, except that the resin component B to serve as a coating agent was changed from the acrylic-modified product used in Example 1 to a bisphenol-A epoxy resin ("jER" manufactured by Mitsubishi Chemical Corporation). The results are also shown in Table 1.

Example 3

A fiber material for cement reinforcement and a concrete formed body were produced and evaluated in the same manner as in Example 1, except that the resin component A to serve as a bundling agent was changed from the dimethylpyrazole-blocked hexamethylene diisocyanate used in Example 1 to a mixed solution of a sorbitol polyglycidyl ether-based epoxy compound and caprolactam-blocked diphenylmethane diisocyanate (GRILBOND IL-6 manufactured by EMS) as the resin component A. The results are also shown in Table 1.

Example 4

A fiber material for cement reinforcement and a concrete formed body were produced and evaluated in the same manner as in Example 1, except that as the resin component A to serve as a bundling agent, the epoxy compound used in Example 1 was not used, and dimethylpyrazole-blocked hexamethylene diisocyanate was used alone. The results are also shown in Table 1.

Example 5

A fiber material for cement reinforcement and a concrete formed body were produced and evaluated in the same manner as in Example 1, except that a urethane resin ("BONDIC HS770" manufactured by DIC Corporation) was used as the resin component A to serve as a bundling agent. The results are also shown in Table 1.

Example 6

A fiber material for cement reinforcement and a concrete formed body were produced and evaluated in the same manner as in Example 1, except that the fiber used was changed from the copolymerized aramid fiber used in Example 1 to an aramid fiber made of a homopolymer (aromatic polyamide fiber, "Twaron" manufactured by Teijin Limited, 1,680 dtex, the number of filaments: 1,000, tensile strength: 20.8 cN/dtex). The results are also shown in Table 1.

Example 7

A fiber material for cement reinforcement and a concrete formed body were produced and evaluated in the same manner as in Example 1, except that the fiber used was changed from the copolymerized aramid fiber of Example 1 to a carbon fiber ("TENAX" manufactured by Toho Tenax Co., Ltd., 2,000 dtex, the number of filaments: 3,000, tensile strength: 15.0 cN/dtex). The results are also shown in Table 1.

Example 8

A fiber material for cement reinforcement and a concrete formed body were produced and evaluated in the same manner as in Example 1, except that the fiber used was changed from the copolymerized aramid fiber having a total fineness of 1,670 dtex used in Example 1 to a fiber having a total fineness of 440 dtex (copolymerized aromatic polyamide fiber, "Technora" manufactured by Teijin Limited, 440 dtex, the number of filaments: 267), and the diameter of the treated reinforcing fiber material was 0.25 mm, which is about half. The results are also shown in Table 1.

Example 9

A fiber material for cement reinforcement and a concrete formed body were produced and evaluated in the same manner as in Example 1, except that the fiber used was changed from the treated reinforcing fiber material of Example 1 having a length of 30 mm to one having a length to 15 mm. The results are also shown in Table 1.

Example 10

A fiber material for cement reinforcement and a concrete formed body were produced and evaluated in the same manner as in Example 1, except that the fiber used was changed from the treated reinforcing fiber material of Example 1 having a length of 30 mm to one having a length to 35 mm. The results are also shown in Table 1.

Example 11

A fiber material for cement reinforcement and a concrete formed body were produced and evaluated in the same manner as in Example 1, except that the incorporation rate of the fiber material for cement reinforcement into a concrete formed body was changed from 1 vol % of Example 1 to 0.5 vol %. The results are also shown in Table 1.

Example 12

A fiber material for cement reinforcement and a concrete formed body were produced and evaluated in the same manner as in Example 1, except that the incorporation rate of the fiber material for cement reinforcement into a concrete formed body was changed from 1 vol % of Example 1 to 2.0 von. The results are also shown in Table 1.

Comparative Example 1

A fiber material for cement reinforcement and a concrete formed body were produced and evaluated in the same manner as in Example 1, except that the resin A to serve as a bundling agent was not used, and only the carboxyl-group-containing acrylic-modified bisphenol-A epoxy resin used as the coating agent resin B in Example 1 was used. The results are also shown in Table 1.

Comparative Example 2

A fiber material for cement reinforcement and a concrete formed body were produced and evaluated in the same manner as in Example 1, except that the resin B to serve as a coating agent was not used, and only the sorbitol polyglycidyl ether-based epoxy compound and dimethylpyrazole-blocked hexamethylene diisocyanate, which are components blended as the bundling agent resin A in Example 1, were used. The results are also shown in Table 1.

Comparative Example 3

A fiber material for cement reinforcement and a concrete formed body were produced and evaluated in the same manner as in Example 1, except that in place of the resin A to serve as a bundling agent in Example 1, a sorbitol polyglycidyl ether-based epoxy compound was used alone without using a blocked isocyanate. The results are also shown in Table 1.

Comparative Example 4

The fiber used was changed from the copolymerized aramid fiber used in Example 1 to a PVA monofilament fiber (manufactured by Kuraray Co., Ltd., "RF 4000", 4,000 dtex, the number of filaments: 1, tensile strength: 6.9 cN/dtex). Then, a concrete formed body was produced and evaluated in the same manner as in Example 1, except that this monofilament was used as a fiber material for cement reinforcement in place of a fiber bundled body. The results are also shown in Table 1 (incidentally, some of the evaluation results are also shown in Table 2 for comparison).

Next, an attempt was made to produce a concrete formed body having an incorporation rate of the PVA monofilament fiber (fiber material for reinforcement) increased from 1 vol % to 3 vol %. However, the fibers were entangled after kneading, and separated from the mortar component. The fluidity of the ready-mixed concrete was 111 mm. In addition, it was not possible to normally place the concrete in the mold. Therefore, the bending fracture energy and compressive strength were not measured.

Thus, under the conditions where the incorporation rate of the PVA monofilament fiber (fiber material for reinforcement) was 3 vol % as above, a mortar formed body was obtained using the unhardened cement mortar having a water/binder ratio of 40.0% of Reference Example 2 in place of the ready-mixed concrete having a water/binder ratio of 19.2% of Reference Example 1, and evaluated. The results are also shown in Table 2.

TABLE 1

| | Resin Component A Presence of Isocyanate Component | Amount Attached [%] | Resin Component B Presence of Epoxy Component | Amount Attached [%] | Fiber Material Tensile Strength [cN/dtex] | Diameter [mm] | Fiber Material for Reinforcement Length [mm] | Incorporation Rate [vol %] | Cohesion | Cohesion after Kneading | Fluidity of Ready-Mixed Concrete [mm] | Bending Fracture Energy [N/mm²] | Compressive Strength [kN·mm] |
|---|---|---|---|---|---|---|---|---|---|---|---|---|---|
| Example 1 | Present | 10 | Present | 3 | 21.0 | 0.45 | 30 | 1 | Excellent | Excellent | 275 | 211 | 32.1 |
| Example 2 | Present | 10 | Present | 3 | 21.0 | 0.45 | 30 | 1 | Excellent | Excellent | 268 | 203 | 18.2 |
| Example 3 | Present | 10 | Present | 3 | 21.0 | 0.45 | 30 | 1 | Fair | Excellent | 260 | 209 | 19.8 |
| Example 4 | Present | 10 | Present | 3 | 21.0 | 0.45 | 30 | 1 | Fair | Excellent | 259 | 213 | 18.4 |
| Example 5 | Present | 10 | Present | 3 | 21.0 | 0.45 | 30 | 1 | Fair | Excellent | 253 | 201 | 14.9 |
| Example 6 | Present | 10 | Present | 3 | 16.6 | 0.45 | 30 | 1 | Excellent | Excellent | 267 | 209 | 20.5 |
| Example 7 | Present | 10 | Present | 3 | 12.0 | 0.45 | 30 | 1 | Fair | Excellent | 251 | 213 | 12.8 |
| Example 8 | Present | 10 | Present | 3 | 21.0 | 0.25 | 30 | 1 | Excellent | Excellent | 263 | 216 | 21.3 |
| Example 9 | Present | 10 | Present | 3 | 21.0 | 0.45 | 15 | 1 | Excellent | Excellent | 279 | 213 | 20.5 |
| Example 10 | Present | 10 | Present | 3 | 21.0 | 0.45 | 35 | 1 | Excellent | Excellent | 253 | 201 | 34.5 |
| Example 11 | Present | 10 | Present | 3 | 21.0 | 0.45 | 30 | 0.5 | Excellent | Excellent | 278 | 217 | 10.7 |
| Example 12 | Present | 10 | Present | 3 | 21.0 | 0.45 | 30 | 2 | Excellent | Excellent | 252 | 197 | 49.2 |
| Comparative Example 1 | — | — | Present | 13 | 21.0 | 0.45 | 30 | 1 | Poor | Poor | 153 | 199 | 8.2 |
| Comparative Example 2 | Present | 13 | — | — | 21.0 | 0.45 | 30 | 1 | Excellent | Excellent | 263 | 201 | 9.8 |
| Comparative Example 3 | Absent | 10 | Present | 3 | 21.0 | 0.45 | 30 | 1 | Poor | Poor | 131 | 195 | 7.6 |
| Comparative Example 4 | — | — | — | — | 6.9 | 0.66 | 30 | 1 | — | — | 270 | 199 | 7.4 |
| | — | — | — | — | 6.9 | 0.66 | 30 | 3 | — | — | 111 | Immeasurable | Immeasurable |

TABLE 2

|  | Fiber Material | Diameter [mm] | Incorporation Rate [%] | Formed Body | Cohesion after Kneading | Fluidity of Ready-Mixed Concrete [mm] | Compressive Strength [N/mm²] | Bending Fracture Energy [kN · mm] |
| --- | --- | --- | --- | --- | --- | --- | --- | --- |
| Example 1 | Aramid fiber bundle | 0.45 | 1 | Concrete formed body | Excellent | 275 | 211 | 32.1 |
|  | Aramid fiber bundle | 0.45 | 3 | Mortar formed body | Excellent | 261 | 47 | 44.1 |
| Comparative Example 4 | PVA monofilament | 0.66 | 1 | Concrete formed body | — | 270 | 199 | 7.4 |
|  | PVA monofilament | 0.66 | 3 | Mortar formed body | — | 257 | 45 | 17.2 |

INDUSTRIAL APPLICABILITY

The fiber material for cement reinforcement of the invention causes a smaller decrease in fluidity upon incorporation, and allows for construction in the same manner as in the case where no fibers are incorporated. In addition, high-durability concrete or mortar having excellent mechanical characteristics can be obtained.

What is claimed is:

1. A concrete or mortar formed body, characterized in that the formed body comprises a fiber material for cement reinforcement,
    wherein the fiber material is organic fibers,
    wherein a resin A containing a dimethylpyrazole-blocked isocyanate compound or a caprolactam-blocked isocyanate compound as a constituent component is present inside a fiber bundled body, and a resin B containing an epoxy resin as a constituent component is present on a surface of the fiber bundled body,
    wherein the resin A contains a sorbitol polyglycidyl ether epoxy compound as a constituent component in addition to the isocyanate compound,
    and the resin B contains a bisphenol-A epoxy resin as a main component; and
    wherein the resin A is applied in an amount of 5.0 to 15.0 wt % relative to the total fiber weight, and the resin B is applied in an amount of 0.5 to 5.0 wt % relative to the total fiber weight.

2. The concrete or mortar formed body according to claim 1,
    wherein the resin B contains an acrylic-modified bisphenol-A epoxy resin as a main component.

3. The concrete or mortar formed body according to claim 1,
    wherein the fiber bundled body has a tensile strength of 7 cN/dtex or more.

4. The concrete or mortar formed body according to claim 1,
    wherein the fiber bundled body includes 50 to 3,000 single fibers.

5. The concrete or mortar formed body according to claim 1,
    wherein the resin A contains a polyol compound as a constituent component in addition to the isocyanate compound.

6. The concrete or mortar formed body according to claim 5,
    wherein the resin B contains an acrylic-modified bisphenol-A epoxy resin as a main component.

7. The concrete or mortar formed body according to claim 1,
    wherein the fiber bundled body has a tensile strength of 7 to 40 cN/dtex.

8. The concrete or mortar formed body according to claim 7,
    wherein the fiber bundled body has a tensile strength of 7 to 21.0 cN/dtex.

9. The concrete or mortar formed body according to claim 8,
    wherein the fiber bundled body has a tensile strength of 7 to 16.6 cN/dtex.

10. The concrete or mortar formed body according to claim 7,
    wherein the fiber bundled body has a tensile strength of 10 to 40 cN/dtex.

11. The concrete or mortar formed body according to claim 10,
    wherein the fiber bundled body has a tensile strength of 10 to 16.6 cN/dtex.

12. The concrete or mortar formed body according to claim 1,
    wherein the fibers forming the fiber material are incorporated into the concrete or mortar formed body in an amount of 0.1 to 10.0 vol %,
    wherein the amount is a fiber incorporation rate ($V_f$: fiber volume fraction) expressed by the following equation:

$V_f = (V_1/V_2) \times 100$ wherein $V_1$ represents the volume (liter) of the fibers for reinforcement incorporated per unit volume (1,000 l=1 m³) of the fiber-containing cement formed body, and $V_2$ represents the unit volume (1,000 l=1 m³) of the cement formed body.

13. The concrete or mortar formed body according to claim 9, wherein the organic fibers are polyparaphenylene terephthalamide.

14. The concrete or mortar formed body according to claim 9, wherein the organic fibers are copolyparaphenylene-3,4'-oxydiphenylene-terephthalamide.

15. The concrete or mortar formed body according to claim 1,
    wherein the isocyanate compound is an isocyanate having an aliphatic hexamethylene diisocyanate (HDI) structure.

16. The concrete or mortar formed body according to claim 1,
    wherein the isocyanate compound is dimethylpyrazole-blocked hexamethylene diisocyanate or caprolactam blocked diphenylmethane diisocyanate.

* * * * *